July 15, 1958
O. H. THOMAS
2,842,993
CONTAINER AND DISPENSER WITH CRIMPING
JAWS FOR FISH LINE PELLET SINKERS
Filed July 1, 1955
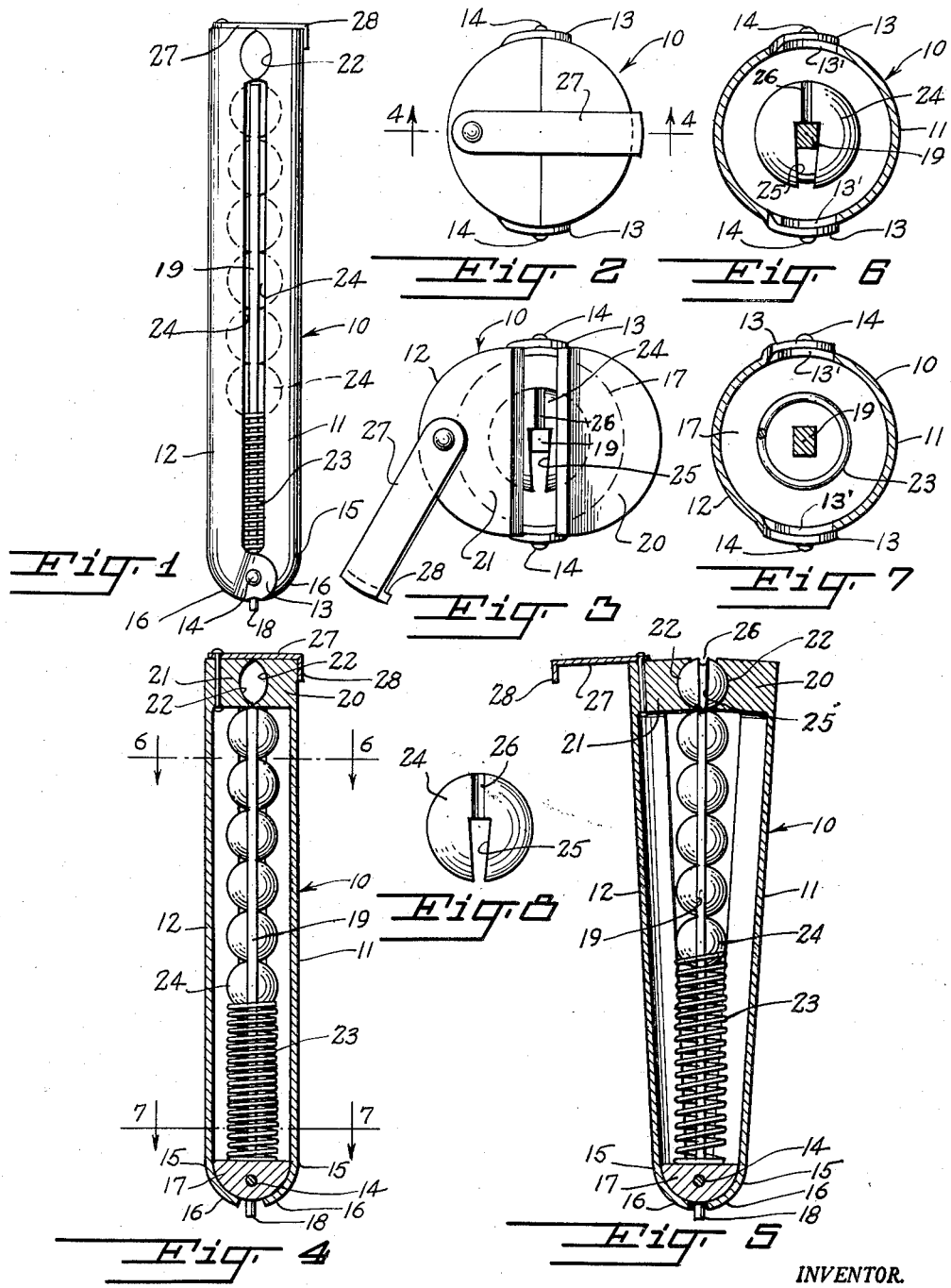
INVENTOR.
Orrin H. Thomas
BY
Christian R. Nielsen
Attorney

United States Patent Office 2,842,993
Patented July 15, 1958

2,842,993

CONTAINER AND DISPENSER WITH CRIMPING JAWS FOR FISH LINE PELLET SINKERS

Orrin H. Thomas, Williamsport, Pa., assignor to Endicott Machine & Tool Company, Inc., Endicott, N. Y.

Application July 1, 1955, Serial No. 519,405

4 Claims. (Cl. 81—15)

This invention relates to a container and dispenser for fish line pellet sinkers and it consists in the constructions, arrangements and combinations herein described and claimed.

It is the object of the invention to provide a dispensing device for fish line pellet sinkers which will house the pellets in a tandem relation to one another, there being spring means to urge the pellets toward a pair of separable jaws having respective seats formed therein for reception of a pellet at the time of the ejection thereof, said jaws being compressible upon a pellet sinker so engaged to secure the same upon a fishing line.

More specifically, it is an objective of the invention to provide a container and dispenser for pellet sinkers, in which the container is constructed from two elongated hingedly connected housing sections, the hinged end thereof including a base member for support of a sinker supporting rod and a helical spring for elevating the tandem arranged sinkers on said rod to a pair of opposed jaws at the upper end of said housing sections, each jaw being provided with a recess to accommodate a sinker therebetween when said housing sections are partially opened, said jaws being manually compressible to distort the sinker to secure the same upon a fishing line, when disposed in the slot provided in pellet sinkers; a latch being employed to retain the housing sections in closed relation.

Additional objects, advantages and features of invention will be apparent from the following description considered in conjunction with the accompanying drawing, wherein, Figure 1 is a side elevation of the container and dispenser in closed position.

Figure 2 is an enlarged top plan view thereof.

Figure 3 is a similar view with the housing sections partially opened with a sinker engaged between the jaws of the housing sections with a fish line engaged within the slot formed in the sinker.

Figure 4 is a longitudinal sectional view of the container and dispenser.

Figure 5 is a similar view illustrating a sinker engaged between the jaws of the housing sections.

Figure 6 is an enlarged cross section on the line 6—6 of Figure 4,

Figure 7 is a similar view on the line 7—7 of Figure 4, and

Figure 8 shows a sinker to be used with the container and dispenser.

There is illustrated a combined container and dispenser for split pellet sinkers, generally indicated by the reference character 10, which consists of a pair of elongated housing sections 11 and 12 having ears 13 and 13′ arranged in overlapping relation and hinged together by a pin 14. The ends 15 of the housing sections are of arcuate shape as indicated at 16 and seated within these sections there is an arcuate shaped bearing block 17 complemental to the curvature 16 of the housing sections, the block 17 being retained within the housing sections by virtue of the passage of the pin 14 therethrough. The block 17 affords rigidity to the housing sections, as well as guiding the movement of the sections 11 and 12 during opening and closing movements of said sections.

A stop pin 18 is secured in the block 17 and extends outwardly between the housing sections 11 and 12, thus limiting the opening movement of the sections.

An angularly shaped rod 19 is mounted in the bearing block 17, extending medially and vertically of the housing sections stopping inwardly of respective jaws 20 and 21 formed at the opposite end of the housing sections.

The jaws 20 and 21 are arranged in opposed relation and each is formed with a recess 22, which may be of any desired shape so as to accommodate different shaped sinkers, and in the present instance, the recesses are constructed to receive spherical shaped sinkers therebetween.

A helical spring 23 encircles the rod 19, one end thereof having seating engagement upon the bearing block 17, while the other end of the spring is in engagement with a sinker 24 which supports a series of sinkers thereabove, all of which are slidable upon the rod 19.

As best seen in Figures 6 and 8, the sinkers are formed with a tapered slot 25, the narrower portion thereof being at the periphery of the sinker, the wider portion embracing the rod 19 freely so that the sinkers may slide thereon under pressure of the spring 23 upon separation of the jaws 20 and 21. The use of an angularly shaped rod 19 prevents rotation of the sinkers. The sinkers 24 are formed with an additional slot 26 which extends at right angles to the slot 25, the sinkers being threaded upon the rod 19 so as to position the slot 26 in an upward direction.

In order that the housing sections 11 and 12 may be retained releasably in closed position for retention of the sinkers, a catch 27 is pivotally mounted upon the upper end of the section 12 and is provided with a lip 28 adapted to engage the section 11, as shown in Figures 1, 2 and 4.

The present day prectice of applying a split sinker to a fishing line is to place the line within the slot of the sinker and then compressing the sinker by means of a pair of pliers or by imparting a hammer-like blow upon the sinker, either method being unsatisfactory, especially if the attachment of a sinker is necessary while in the stream.

In the use of the present device, it is only necessary to release the catch 27 allowing the jaws 21 and 22 to separate to an open position, which is limited by the pin 18. The tension of the spring 23 will elevate the uppermost sinker to a position between the recesses 22 of the jaws 20 and 21. The fishing line is laid transversely across the slot 26, and when the line is so arranged, the jaws 20 and 21 are forced together distorting the sinker and securing the same to the line. The line and attached sinker is then removed from the jaws 20 and 21 and closed, when the latch 27 is moved to retain the sections 11 and 12 in closed relation.

While I have shown and described a preferred form of the device, this is by way of illustration only, and I consider as my own all such modifications in construction as fairly fall within the scope of the appended claims.

I claim:

1. A combined container and dispenser for split pellet sinkers comprising a pair of elongated hollow housing sections hingedly connected at one end, a pair of opposed compression jaws at the opposite end, a guide means extending longitudinally of said housing sections for slidably supporting split pellet sinkers in tandem relation, and spring means for urging the uppermost sinker between said jaws upon opening movement of said housing sections.

2. A combined container and dispenser for slit pellet sinkers comprising a pair of elongated hollow housing sections hingedly connected at one end, a pair of opposed compression jaws at the opposite end and a bearing block at the hinged end of said housing sections, a rod fixed in said bearing block and extending vertically and medially between said housing sections and terminating inwardly of said compression jaws, said rod slidably supporting split pellet sinkers in tandem relation, a helical spring encircling said rod having one end engaged with said bearing block, the other end having seating engagement with the lowermost sinker, the compression of said spring urging the uppermost sinker between said jaws upon opening movement of said housing sections.

3. The structure of claim 2, in which said rod is of angular cross section complemental to the slot of said split pellet sinker.

4. The structure of claim 2, in which said bearing block includes a stop means for limiting the opening movement of said housing sections.

References Cited in the file of this patent

UNITED STATES PATENTS

| | | |
|---|---|---|
| 1,158,345 | Weaver | Oct. 26, 1915 |
| 2,459,959 | Pelmarsh | Jan. 25, 1949 |
| 2,618,994 | Frazee | Nov. 25, 1952 |
| 2,651,958 | Deline | Sept. 15, 1953 |
| 2,701,421 | Vironda | Feb. 8, 1955 |
| 2,765,686 | Deline | Oct. 9, 1956 |